United States Patent
Seemann

(10) Patent No.: US 6,863,156 B2
(45) Date of Patent: Mar. 8, 2005

(54) GEARBOX HOUSING ELEMENT AND METHOD FOR ACTING UPON THE OIL LEVEL OF A GEARBOX

(75) Inventor: Dieter Seemann, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 81 days.

(21) Appl. No.: 10/151,287

(22) Filed: May 21, 2002

(65) Prior Publication Data

US 2002/0194952 A1 Dec. 26, 2002

(30) Foreign Application Priority Data

May 22, 2001 (DE) .......................... 101 24 864

(51) Int. Cl.$^7$ ............................................. F01M 11/12
(52) U.S. Cl. ..................... 184/1.5; 184/103.1; 141/65
(58) Field of Search .................... 74/606 R; 184/1.5, 184/7.4, 6.18, 74, 82, 103.1; 222/64, 464.1; 141/65, 95, 98, 198, 383, 384; 285/192, 210, 921

(56) References Cited

U.S. PATENT DOCUMENTS

| | | | | |
|---|---|---|---|---|
| 2,297,830 A | | 10/1942 | Hardage ...................... 137/34 |
| 3,072,318 A | * | 1/1963 | Berger et al. ................ 417/521 |
| 3,662,858 A | * | 5/1972 | Peterson ................... 184/103.1 |
| 3,910,550 A | * | 10/1975 | Nelson ........................ 251/144 |
| 4,269,237 A | * | 5/1981 | Berger ........................ 141/346 |
| 4,530,421 A | * | 7/1985 | Balch ........................... 184/1.5 |
| 4,589,524 A | * | 5/1986 | Laycock ................... 184/103.1 |
| 4,841,581 A | * | 6/1989 | Russell ........................... 4/400 |
| 5,251,938 A | * | 10/1993 | Erickson ......................... 285/5 |
| 5,368,181 A | | 11/1994 | Myers ......................... 220/303 |
| 5,808,187 A | * | 9/1998 | Gooden et al. ............. 73/118.1 |

FOREIGN PATENT DOCUMENTS

| | | |
|---|---|---|
| DE | 246589 | 5/1911 |
| DE | 7117421 | 10/1971 |
| DE | 8702740 | 7/1987 |
| DE | 8812723 | 2/1989 |
| DE | 4321490 | 1/1994 |
| DE | 19644738 | 4/1998 |

* cited by examiner

*Primary Examiner*—Chong H. Kim
(74) *Attorney, Agent, or Firm*—Crowell & Moring LLP

(57) ABSTRACT

A gearbox housing element having an oil outlet opening and a method for acting upon the liquid level of a gearbox is disclosed. The gearbox housing element has a device which can be brought into two working positions. In a first working position, the height of the liquid level in the gearbox housing during the filling and operation of the gearbox is predetermined by an upper opening of the device. In a second working position for draining the gearbox oil, an oil drain opening of the device is released, which opening is arranged below the upper opening and therefore permits draining of a large part of the oil disposed in the gearbox. The oil drain opening is opened by a tool which is introduced into the oil drain opening from outside the gear box housing. The gearbox can be an automatic gearbox for motor vehicles.

7 Claims, 2 Drawing Sheets

GEARBOX HOUSING ELEMENT AND METHOD FOR ACTING UPON THE OIL LEVEL OF A GEARBOX

BACKGROUND AND SUMMARY OF THE INVENTION

This application claims the priority of German Patent Document No. 101 24 864.4, filed May 22, 2001, the disclosure of which is expressly incorporated by reference herein.

The present invention relates to a gearbox housing element and to a method for acting upon the oil level of a gearbox.

German Patent Document DE 196 44 738 A1 of the generic type discloses a device for regulating the oil level in an automatic gearbox. The device has an upper opening which can be adjusted in height to a small extent and by means of which the height of an oil level can be predetermined. If, for example during a filling process, the oil level exceeds the height of the upper opening, oil emerges through the upper opening and out of the gearbox housing, from an oil outlet opening, until the oil level corresponds to the oil level predetermined by the height of the upper opening.

Special features for draining or exchanging the oil are not to be found in the prior art forming the generic type. It is known therefrom to remove an entire oil sump together with the oil disposed therein from the gearbox housing, in which case great care has to be taken during the removal and transportation of the oil sump in order to avoid the oil escaping. As an alternative, the arrangement of a separate oil drain plug is known which, however, demands an increased outlay on design and construction space, an increased weight and an increase of necessary sealing points to the outside.

Taking this as the starting point, the present invention provides a gearbox housing element and a method by means of which simplified drainage or exchange of oil is permitted with simple regulation of the height of the oil level.

In a first working position, which corresponds, for example, to a (permanent) operating position and/or a filling position, the upper opening predetermines the height of an oil level. In this connection, the upper opening can be arranged at a predetermined fixed height. As an alternative, the height of the upper opening can be adjusted according to an operating parameter, such as the temperature of the gearbox oil, in particular in accordance with one of the embodiments according to German Patent Document DE 196 44 738 A1, the disclosure of which is expressly incorporated by reference herein.

The device can be brought into a second working position for the at least partial emptying of the oil volume from the gearbox housing. In this position, the oil can be drained via an oil drain opening of the device, which opening is arranged below the upper opening. The volume of the oil which can be emptied is correlated here with the difference in the heights of the upper opening and the oil drain opening provided. According to the invention, before the oil sump is removed, oil can be drained through the oil drain opening, as the result of which the process of removing the oil sump and of removing the oil from the latter is decisively simplified. At the same time, the necessity of a separate oil drain plug and the provision of further sensitive sealing points are superfluous. If the oil drain opening is arranged at the lowest point of the oil sump, the gearbox oil can be virtually completely emptied before the oil sump is removed.

An advantageous feature of the gearbox housing element according to the invention includes a mechanical action upon the device that takes place from the lower side of the gearbox or the oil sump through the oil outlet opening. This mechanical action is used to bring the device from the first working position into the second working position, i.e., the oil drain opening arranged below the upper opening is created. For example, the oil drain opening is formed with apertures which are closed in the first working position, and in the second working position create a connecting duct between the internal volume of the oil sump and the oil outlet opening, through which duct the oil can emerge in order to drain the volume. The oil outlet opening can be formed, for example, by a (rotary) sliding valve. Accordingly, the upper opening and the oil drain opening are formed by different parts or subregions of the device. In the second working position, the upper opening can furthermore be opened or else closed.

In accordance with an embodiment of the gearbox housing element according to the invention, in the first working position part of the device has a tight connection to the oil drain opening. This tight connection can be released by the mechanical action, for example of a suitably designed tool, in order to produce the second working position by releasing the oil drain opening. The mechanical action in particular causes the part of the device which is arranged above the oil drain opening to be released from the gearbox housing, so that only the oil drain opening, which is opened in the second working position, is present and creates a connection of the internal volume of the oil sump to the oil outlet opening.

The device is preferably formed with a snap-in pipe. The snap-in pipe is connected to the gearbox housing. The connection is undertaken here by a snap-in process which involves a form-fitting engagement which can be released by snapping in or elastic deformations of the components involved. The use of a snap-in pipe of this type enables the gearbox housing element according to the invention to be designed in a particularly simple manner.

The present invention also includes a method for acting upon the liquid level of a gearbox, in which when the gearbox is being filled with oil or during operation of the gearbox, an upper opening of a device, which forms a connecting duct to the surroundings, predetermines the height of an oil level of the gearbox. In order to drain the oil, a tool enters into the oil outlet opening (which is still closed) from the lower side of the gearbox and acts mechanically upon the device in such a manner that an oil drain opening of the device, which opening is arranged below the upper opening, is created in order to empty the oil volume. The gearbox oil can be drained before the oil sump is removed, in which case the provision of a separate oil drain plug is superfluous. The method according to the invention can be carried out in a particularly simple, clean and rapid manner.

Two preferred exemplary embodiments of the device according to the invention will be explained in greater detail below with reference to the drawings.

Other objects, advantages and novel features of the present invention will become apparent from the following detailed description of the invention when considered in conjunction with the accompanying drawings.

DETAILED DESCRIPTION OF THE DRAWINGS

Figure 1:
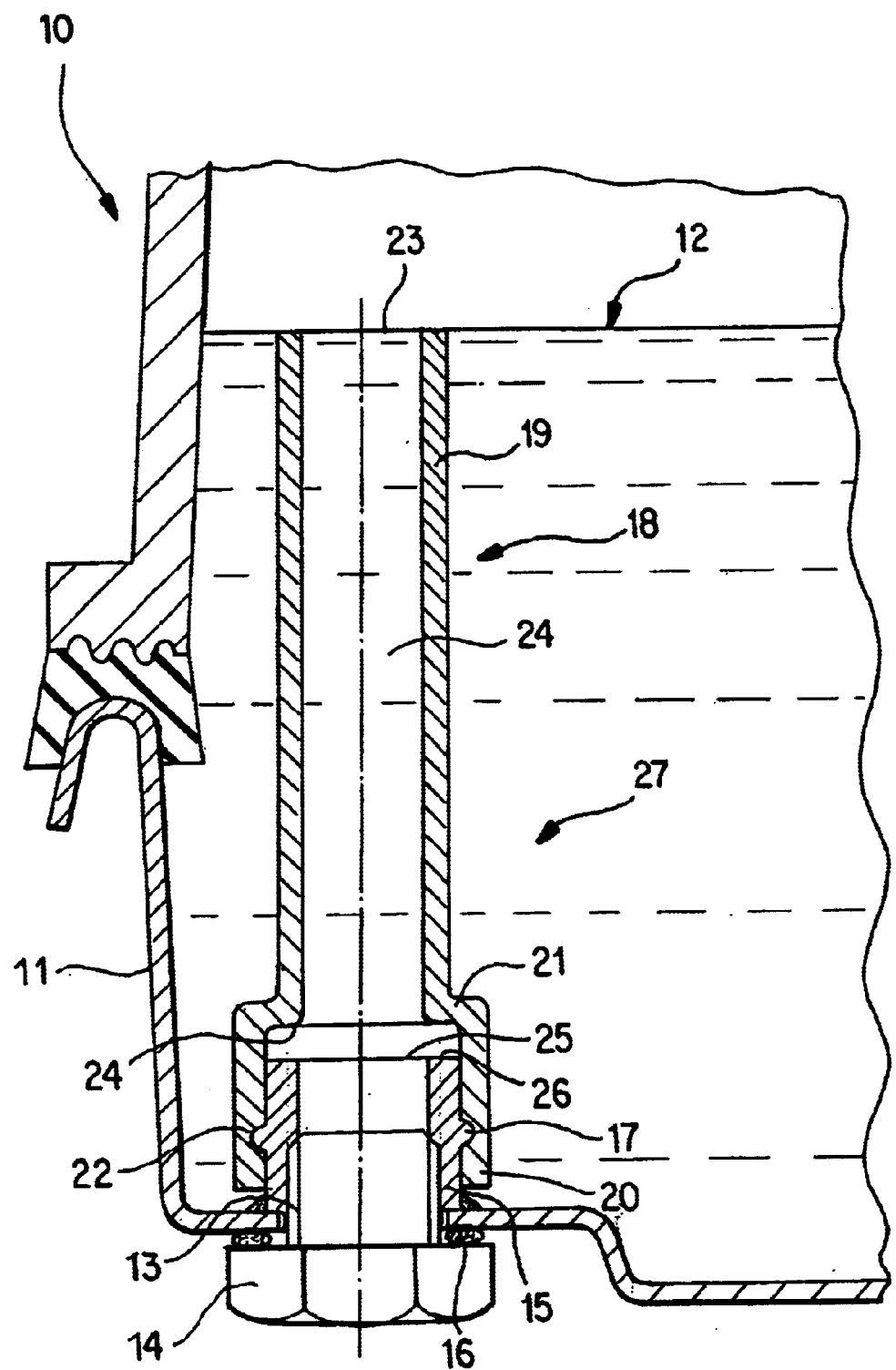
FIG. 1 shows a gearbox housing element according to the invention in a first working position.

FIG. 1 shows a gearbox housing element according to the invention in a first working position. A gearbox housing 10, in particular of an automatic gearbox, is formed in the lower region by an oil sump 11 which is connected tightly to further parts of the gearbox housing. Oil is disposed in the gearbox housing 10 at a predetermined oil level 12.

At a location facing the bottom the oil sump has an oil outlet opening 13 which, according to FIG. 1, can be closed in the first working position by a plug 14. The plug 14 enters into an operative connection with an internal thread in the oil sump 11 or in a sleeve 15 assigned to the oil sump 11. Sealing elements 16 suitable for sealing purposes can be arranged between the plug 14, oil sump 11 and sleeve 15.

In the outer region, the sleeve 15 has an essentially cylindrical lateral surface and a projection 17 which emerges radially outwards out of the lateral surface. The projection 17 is of approximately semi-annular or bead-shaped design and is arranged approximately in the center of the longitudinal extent of the cylindrical lateral surface of the sleeve 15. A snap-in pipe 18 is placed onto the sleeve 15 from above in the vertical direction. The snap-in pipe 18 has two hollow-cylindrical subregions 19, 20 which are connected to each other in a coaxial longitudinal extent via a connecting region 21. Subregion 19 has a smaller inside diameter than the subregion 20 and than the inner holes in the sleeve 15 and the oil outlet opening 13. The subregion 20 has a cylindrical, inner lateral surface which bears against the outer lateral surface of the sleeve 15. A recess 22, the contour of which is designed correspondingly with the contour of the projection 17, is provided in the region of the cylindrical inner surface of the subregion 20. The lower subregion 20 bears against the outer surface of the sleeve 15 forming a radial contact pressure, in particular in the region of the projection 17, as a result of which a sealing action is brought about.

In the first working position illustrated in FIG. 1, the snap-in pipe is orientated approximately vertically and is connected tightly to the sleeve 15. The connection is produced by elastic widening of the snap-in pipe 18 in the region of the subregion 20 until the projection 17 enters into the recess 22. In the end region facing away from the connecting region 21, the subregion 19 has an upper opening 23.

In order to fill the gearbox housing 10, in the first working position of the snap-in pipe 18 gearbox oil is filled or pumped into the gearbox housing 10, for example, through a separate introducing opening, a filling connection or else the oil outlet opening 13. If the oil level 12 exceeds the height of the upper opening 23, the height being predetermined by the upper end surface of the snap-in pipe 18, when the plug is removed the oil can escape through the upper opening 23, a connecting duct 24, which is formed by connected inner holes in the subregions 19, 20, the inner hole of the sleeve 15 and the oil outlet hole 13 into the surroundings or into an oil-collecting container (not illustrated), with the result that the oil level is automatically set to the height of the upper opening 23. After this setting process, the gearbox housing can be firmly closed by screwing in the plug 14.

In order to empty the oil from the gearbox housing 10, the plug 14 is removed. With a suitable tool, for example a mandrel which is introduced from below into the oil outlet opening 13 and through the inner hole in the sleeve 15, a force is exerted upwards on the snap-in pipe 18, in the longitudinal direction thereof, in particular in the region of a circular inner end surface 24. In the exemplary embodiment illustrated in FIG. 1, the end surface 24 is formed by an end surface of the connecting region 21, which end surface faces the oil outlet opening 13. As a consequence of force being exerted in the longitudinal direction of the snap-in pipe 18 and of the geometry of the projections 17 and depression 22, the subregion 20 is radially widened until the projection 17 can emerge from the depression 22 and, by means of a relative displacement of the snap-in pipe 18 with respect to the sleeve 15, the snap-in pipe 18 is pushed by the sleeve 15. The snap-in pipe 18 subsequently drops laterally into the oil sump or floats in the draining-off oil. With the snap-in pipe 18 released from the sleeve 15, the gearbox housing element is situated in the second working position. In that end region of the sleeve 15 which faces away from the oil sump 11, the sleeve forms the oil drain opening 25 which is connected via an inner hole of the sleeve 15 to the oil outlet opening 13 in order to drain the oil. In the above-mentioned second working position, oil can be drained until the oil level 12 has sunk to a height predetermined by that end surface 26 of the sleeve 15 which is assigned to the oil drain opening 25.

According to FIG. 1, the sleeve 15 can be connected to the oil sump 11 as a separate component or else can be designed as an integral component of the gearbox housing or of the oil sump 11. The snap-in pipe 18 is preferably manufactured from plastic. In particular, a polyamide having a glass fiber content of approximately 20% is used.

The tool enters into operative connection in order to release the snap-in pipe 18 from the sleeve 15, by exerting a force acting approximately in the longitudinal direction of the snap-in pipe 18. As an alternative or in addition, the exertion of a moment rotating in particular about the longitudinal axis of the snap-in pipe 18 is possible. As alternatives from the snap-in connection between the snap-in pipe 18 and sleeve 15, which connection is illustrated in FIG. 1, any desired sealing and releasable connection can be used which can be released from the outside of the gearbox, in particular a threaded connection.

According to FIG. 1, the oil level 12 can be set according to the invention to a height which lies above the connecting point of the oil sump 11 to the rest of the gearbox housing 10, which would not be possible for removal of the oil sump 11 without previous draining of the oil.

The device 27 for regulating the oil volume arranged in the gearbox housing 10 is formed by the snap-in pipe 18 and the sleeve 15. In the exemplary embodiment illustrated in FIG. 1, in the first working position the device 27 is formed by the snap-in pipe 18 and sleeve 15 connected to each other, while in the second working position the snap-in pipe 18 and the sleeve 15 of the device 27 are separated spatially from each other.

After the emptying of the gearbox housing, the snap-in pipe 18 can again be placed onto the sleeve 15 and reused for a new filling procedure.

Figure 2:
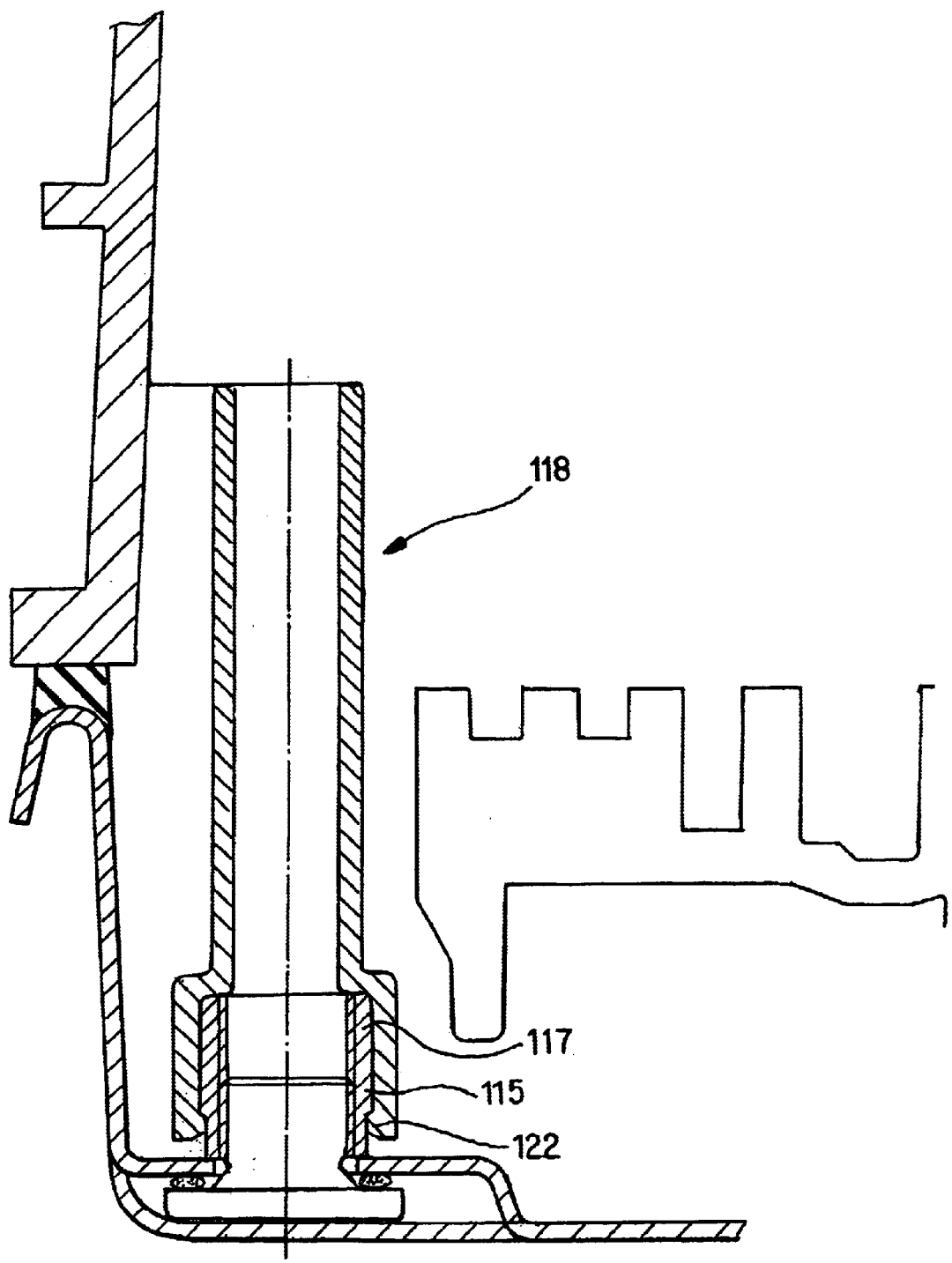
FIG. 2 shows a gearbox housing element according to the invention in an alternative embodiment.

FIG. 2 shows a gearbox housing element according to the invention in an alternative embodiment.

The construction of the alternative embodiment, which is substantially similar, differs from the first exemplary embodiment through the design of the plug-in connection. In this case, a snap-in pipe 118 is designed at the lower end with an annular step 122 which is directed radially inwards and grips behind a corresponding, radially offset, i.e., widened in the outside diameter, region 117 of a sleeve 115.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

What is claimed is:

1. A gearbox housing element having an oil outlet opening which is closed by a device for regulating an oil volume disposed in a gearbox housing, wherein in a first working position the device predetermining, in a region of an upper opening, a height of an oil level, and wherein in a second working position of the device an oil drain opening arranged below the upper opening is released in order to empty at least a majority of the oil volume by gravity, wherein the device is brought from the first working position into the second working position by a mechanical action from outside the gearbox housing through the oil outlet opening, wherein in the first working position, a part of the device has a tight connection to the oil drain opening of the gearbox housing and the tight connection is released by the mechanical action in order to produce the second working position, and wherein the device is connected to the gearbox housing by a snap-in pipe.

2. The gearbox housing element according to claim 1, wherein, in order to produce the tight connection, the snap-in pipe externally surrounds a mating element assigned to the oil outlet opening.

3. The gearbox housing element according to claim 1, wherein the snap-in pipe is formed from plastic.

4. The gearbox housing element according to claim 2, wherein the snap-in pipe is formed from plastic.

5. A method for acting upon the oil level of a gearbox, in which when the gearbox is being filled with oil or during operation of the gearbox the oil level is set by an upper opening of a device, comprising:

draining the oil by a tool acting mechanically upon the device from a lower side of the gearbox through an oil outlet opening and, as a consequence of the mechanical action, an oil drain opening of the device, which opening is arranged below the upper opening, is created in order to empty at least a majority of an oil volume by gravity, wherein the device comprises a pipe with a first region and a second region, the first region having a larger outside diameter than the second region, and wherein when the pipe is in the first operative position, the first region is engaged with a sleeve disposed within the oil sump and over the oil outlet opening, and the sleeve includes a projection on an outer surface thereof and wherein the first region defines a recess in an inner surface of the pipe and further wherein when in the first operative position the projection is received within the recess.

6. A gearbox housing comprising:

an oil sump;

an oil outlet opening defined by the oil sump;

a sleeve disposed within the oil sump and over the oil outlet opening; and a pipe, wherein in a first operative position the pipe is engaged with the sleeve, wherein in a second operative position the pipe is not engaged with the sleeve, wherein when in the second operative position, at least a majority of the oil sump may be emptied by gravity, wherein the pipe has a first region and a second region, the first region having a larger outside diameter than the second region, and wherein when the pipe is in the first operative position, the first region is engaged with the sleeve, and wherein the sleeve includes a projection on an outer surface thereof and wherein the first region defines a recess in an inner surface thereof and further wherein when in the first operative position the projection is received within the recess.

7. A method of acting upon an oil volume of a gearbox comprising the steps of:

establishing a filled level of the oil volume in the gearbox by positioning a pipe on a sleeve disposed over an oil outlet opening defined by a sump of the gearbox and draining oil through the pipe, the sleeve and the oil outlet opening, and draining the sump of at least a majority of the oil volume by gravity by removing the pipe from the sleeve and dispensing oil through the sleeve and the oil outlet opening, wherein the step of removing the pipe from the sleeve includes the step of disengaging a projection on the sleeve from a recess defined by the pipe.

* * * * *